United States Patent Office 3,528,842
Patented Sept. 15, 1970

3,528,842
COPPER COMPOUND-CONTAINING ALGICIDAL SURFACING AND PROCESS
Arnis Skadulis, St. Paul, Minn., assignor to Minnesota Mining and Manufacturing Company, St. Paul, Minn., a corporation of Delaware
No Drawing. Filed July 22, 1966, Ser. No. 567,051
Int. Cl. B32b 11/02; C09d 5/14
U.S. Cl. 117—27
13 Claims

ABSTRACT OF THE DISCLOSURE

An algicidal-fungicidal roofing granule comprising base inorganic granules coated with a moisture permeable insoluble pigmented, fired inorganic composition and a quantity of a substantially water-insoluble inorganic copper compound having slight solubility in water under acidic conditions. The copper compound is sufficient to maintain a condition toxic to the growth of algae and fungus on a surface coated with these granules for a period of years.

This invention relates to inorganic coatings for outdoor surfacing having algicidal and/or fungicidal properties, to articles such as roofing granules coated therewith, and to methods for protecting surfaces from the growth of algae thereon.

Roofing granules, both natural and artificially color-coated granules, find extremely wide use in roofing and siding materials. Important applications are in granule surfaced bituminous roll roofing and asphalt shingles. The granules form a coating partially embedded in one surface of asphalt-impregnated and asphalt-coated fibrous sheet material to provide an adherent weather-resistant and decorative exterior surface.

For many years there has been what is commonly referred to as a "fungus" problem in the Gulf Coast area of the United States as well as in other isolated areas. This problem is manifest as a severe discoloration of granule-coated asphalt surfacing on house roofs, walls, decks, and the like. The dominant micro-organism actually causing this discoloration problem has been identified as the alga *Gloeocapsa magma*. Several other species of algae along with some fungi are also generally found on the discolored surfaces in lesser amounts. In more northern coastal areas a similar problem has been caused by similar or other algae. The discoloration generally becomes visibly apparent during the second or third year after the surfacing has been applied, usually first in the form of dark spots which develop into streaks followed by a more or less complete covering of the surface by a dark gray-black growth which is particularly unsightly on originally light-colored roofing.

Insofar as I am aware no practical and commercial solution to the discoloration problem has been formerly provided. This invention provides surprisingly effective protection to surfaces exposed in algae infested areas for periods of years.

Methods have long been known for the artificial coloring of roofing granules, consisting of crushed and screened minerals, in which the granules are coated with a suitable pigment in an inorganic bond. The bond is usually applied in the form of a soluble silicate solution and is insolubilized by heat treatment and chemical action to a substantially water-insoluble state and is strongly adherent to the base granule. In carrying out these methods the pigment is uniformly applied to the granule surface with the soluble silicate solution.

The soluble silicate binder is converted to an insoluble state by heat treatment and chemical action as by the addition of clay or an acidic material to the soluble silicate, either before, during or after the application of the mixture of soluble silicate and pigment to the mineral granules, in order to obtain a reaction between the clay or acidic material and the alkaline portion of the silicate.

Numerous organic chemicals have been used to control or prevent the growth of fungi and algae. Such chemicals can not, however, be applied to granules before firing because they would be volatilized and rendered ineffective. Application of such compounds over the surface of the fired granules does not provide lasting effects and thus discoloration occurs nearly as soon as with untreated granules. Similarly, organic-based paints such as those used in marine applications which often include materials such as copper compounds to prevent the growth of aquatic life on the coated surfaces would not give long-term protection to building surfaces, particularly roofs. Such surfaces often reach temperatures above which the organic vehicle would deteriorate, and thus obectionable repainting would be necessary at least annually. Moreover, such coatings over granule surfaces would cause an unwanted change in the appearance of the roof or other surface.

Highly water-soluble known alkicidal compounds such as $CuSO_4$, which would be leached out of a surface by rain fall and other naturally occurring moisture within a few months would not be effective because the discoloration produced by algal growth often does not become visible for two or three years after installation of the surfacing. Thus such readily leachable material would not produce an appreciable delay in the appearance of the discoloration. On the other hand, virtually water-insoluble compounds such as $CuO$, $AgI$ and $Pb_3(PO_4)_2$ which contain known anti-microbial cations have not proved effective due to reasons which are not fully understood, perhaps due to insufficient solubility of the materials.

A practically useful algicide for outdoor surfacing must be capable of protecting the surfaces from algal growth for a length of time approximating the normal useful life of the surfacing. Substantially water-insoluble copper compounds which have limited solubility in acidic solutions, such as $Cu_2O$ or $Cu_2Br_2$ in porous ceramic coatings have proved surprisingly effective in maintaining surfaces coated therewith free of algal infestations for long periods of time even when incorporated in the coating compositions in very minor amounts. Roofing granule coatings containing these compounds appear effective in maintaining surfaces such as roofs and siding coated therewith free of algae for a long period of years, further tending to have a cleaning up effect on previously infested surfaces positioned adjacent the surfaces coated with such granules. Asbestos siding coated with copper compound-containing fired ceramic coatings in accordance with this invention can also be provided.

It is believed that the substantially water-insoluble copper compounds due to their insolubility in neutral solutions, are not washed out in heavy rain falls which are frequent in most algae infested regions. However, in periods of dew or light drizzle when algal growth is most likely to occur, the quantity of moisture on a surface is smaller and this moisture becomes acidic due to decomposition products of asphalt roofing substrates and to "atmospheric acids." The pH of such moist roofing is estimated to be in the range of 2–4. The algicidal compounds are somewhat soluble under these acidic conditions and are released in relatively greater amounts effective to prevent growth of algae on the surfaces. Thus the compounds are very gradually released in sustained amounts over a period of years.

To be capable of being incorporated into fired coatings, the copper compound must be capable of withstanding the firing temperatures involved, which are often in the 800°–1000° F. range, and which exceed a minimum of 350° F. The lower temperatures are feasible in systems wherein an acidic material such as $AlCl_3$ is reacted with the alkali silicate. See for example U.S. Pat. No. 2,614,501 (Buzzell et al.), Oct. 14, 1952, or 2,981,636 (Lodge et al.), Apr. 25, 1961.

The coatings of this invention have proved effective in retarding growth of algae when present on roofing granules in amounts as small as 0.2% of the coating weight, which amounts to about ½ lb. of copper compound per ton of granules. 200 lbs. per ton is a practical upper limit for the amount to be added. In practice it is preferred to use from about 2 to 20 lbs. of copper compound per ton of roofing granules.

To be effective the copper compound must be in a readily avilable form within a moisture permeable coating composition so that it will be gradually leached out when exposed to periods of high acidity. The coating compositions most commonly used on roofing granules are insolubilized clay-alkali metal silicate compositions such as those disclosed in U.S. Pat. No. 2,379,358 (Jewett) issued June 26, 1945. Such compositions contain a hydrous plastic clay such as kaolin and an alkali metal silicate, generally sodium silicate, which are heated to a temperature above the dehydration point of the silicate but below the melting point of the clay e.g., 800°–1000° F. to form an insoluble highly weather-resistant durable yet somewhat water permeable coating. These coating compositions contain appropriate pigments, generally metal oxides, to impart the desired color to the coating. More recently it has been found desirable to add a small amount of an alkali soluble fluorocarbon surface active compound having a fluorocarbon "tail" in the molecule in order to improve the luminous reflectance (lightness) and/or color intensity of the coating. See U.S. Pat. No. 2,951,770 (Lodge et al.) issued Sept. 6, 1960. It is also known that the addition of a small amount of borax to the composition makes possible the firing of the compositions at lower temperatures. See U.S. Pat. No. 3,255,031 (Lodge et al.) issued June 7, 1966.

The alkali metal silicate-clay coatings are conventionally applied to any suitable base raw mineral granules such as greystone (argillite) or nepheline syenite by mixing an aqueous slurry of the coating composition thoroughly together with the granules and then firing.

Silicate compositions can also be applied to shingles molded out of cementitious materials such as asbestos cement.

The alkali metal silicate-clay coatings, even though they are highly durable, water resistant and insoluble, are sufficiently porous to permit some moisture to permeate the same. Thus, these compositions are to be distinguished from impermeable glazes previously known in the art such as those disclosed in U.S. Pat. No. 1,782,649 (Fisher) issued Nov. 25, 1930, wherein salts, including highly soluble $CuSO_4$, used for coloring the coatings, although known fungicides, were essentially inert due to the impermeability of the glaze coatings. Further, highly soluble compounds such as $CuSO_4$, when incorporated into permeable coatings as are the copper compounds of this invention, are leached out within a few weeks or months and delay algal growth for only a very short time, if at all. The compositions of this invention are believed to provide effective protection against algal growth for the major part of the expected useful life of the roofing on which the coatings are used.

In cases of roofs surfaced with the compositions of this invention roofs may be made up from shingles coated wholly with such granules or the algicidal granules may be mixed or blended with conventional granules. Algicidal granules interspersed with the conventional granules are effective in maintaining the entire shingle surface free of visible algal growth. In a further embodiment the granules of this invention may be applied to specific areas, for example, to form a "shadow line" along the top edges or other areas of the shingles. Where algicidal granules are used in blends or "shadow lines" a larger amount of copper compound with generally be included in the granule coating, for example, 20–100 lbs. per ton of granules.

The following examples in which all parts given are by weight unless otherwise specified will serve to further illustrate the invention.

EXAMPLE I

A first coating composition of the following formulation was prepared by mixing the ingredients:

| Ingredients: | Parts |
|---|---|
| $TiO_2$ (rutile) | 12.0 |
| Kaolin | 50.0 |
| Potassium salt of N-ethyl, N-perfluorooctanesulfonyl glycine having the formula $C_8F_{17}SO_2N(C_2H_5)CH_2COOK$ | 0.01 |
| Sodium silicate (aqueous, 42.9% solids) ($Na_2O:SiO_2$ ratio 1:2.9) | 80.0 |
| $H_2O$ | 20.0 |

The composition was applied to 2000 parts of #11 grade (−10+35 mesh) granules, for example, nepheline syenite granules in a tumbling barrel type mixer. The coating was then pre-dried by passing a stream of heated air on the granules in the mixer. The granules were then transferred to a rotary firing pot and fired to 950° F., removed from the firing pot and allowed to cool.

In the meantime a second coating composition was prepared by mixing ingredients in accordance with the following formulation:

| Ingredients: | Parts |
|---|---|
| $TiO_2$ (rutile) | 16.0 |
| Kaolin | 10.0 |
| Borax | 4.0 |
| $Cu_2O$, pigment grade | 2.0 |
| $C_8F_{17}SO_2N(C_2H_5)CH_2COOK$ | 0.01 |
| Sodium silicate (aqueous, 42.9% solids) | 45.0 |
| $H_2O$ | 20.0 |

The second coating composition was applied to the colored pre-coated granules in the mixer, following which the granules were fired to 700° F. to insolubilize the silicate coating. The granules were again poured out of the firing pot and allowed to cool. The resulting granules had a very slightly reddish off-white color.

The cooled granules were treated with a suitable oil in accordance with conventional practice and applied to an asphalt roofing shingle. The roofing shingle was tested for resistance to growth of algae by attaching it to a test rack positioned at a 45° angle and facing north near Houston, Texas. In order to accelerate the rate of algal growth, an algae infested seed shingle removed from an infested roof was placed directly above the test shingle to expose it to the algae. A control shingle was also prepared in the same manner with the $Cu_2O$ omitted from the coating and similarly positioned on the test rack beneath an algae infested shingle. A further algae infested seed shingle was attached directly below the test shingle and the control shingle. After a period of 8 months of exposure some clean-up effect or retardation of the algal growth on the seed shingle directly beneath the test shingle was observable. At this time a slight amount of algal growth was observable on the control shingle but the test shingle was free of any visible algal growth.

After about 2 years exposure the test shingle remained virtually free of visible discoloration due to growth of microorganisms and a noticeable clean-up effect could be observed on the seed shingle beneath the test shingle. In contrast the control shingle was noticeably discolored by an algal infestation. The seed shingles above the test and control shingles and that below the control shingle remained thoroughly discolored by algae at all times.

EXAMPLE II

Roofing granules were prepared as in Example I with the difference that 2 parts of $Cu_2Br_2$ were substituted for the 2 parts $Cu_2O$. The granules were applied to conventional asphalt roofing shingles.

When placed on a test rack in the same manner as the test shingle of Example I, the shingle containing the $Cu_2Br_2$ showed no visually observable discoloration due to algal growth and some clean-up effect on the seed shingle beneath it was observable.

EXAMPLE III

The following composition was applied to granules as in Example I and fired to 950° F.:

| Ingredients: | Parts |
|---|---|
| Kaolin | 40.0 |
| Sodium silicate (aqueous 42.9% solids) | 60.0 |
| $C_8F_{17}SO_2N(C_2H_5)CH_2COOK$ | 0.01 |
| $Cu_2O$, pigment grade | 20.0 |
| $H_2O$ | 25.0 |

The following blue colored coating was then applied and fired to 910° F.:

| Ingredients: | Parts |
|---|---|
| Kaolin | 30.0 |
| Sodium silicate (aqueous 42.9% solids) | 50.0 |
| $C_8F_{17}SO_2N(C_2H_5)CH_2COOK$ | 0.01 |
| Cobalt blue stain | 3.0 |
| $TiO_2$ (rutile) | 7.0 |
| $H_2O$ | 25.0 |

The resulting granules were bluish-gray in color and were applied to the upper one-fifth of the exposed portion of asphalt roofing shingles and the lower four-fifths of the exposed portion of each shingle was surfaced with conventional white granules.

This provided a blue shadow line effect at the top of the exposed portion of each shingle. The $Cu_2O$ in the coating of the blue granules is provided to maintain the entire shingle free of unsightly algal growth.

What is claimed is:

1. Algicidal granules for outdoor exposure comprising base raw mineral granules coated with a moisture permeable inorganic alkali-metal silicate pigmented composition and a quantity of said composition containing at least ½ lb. per ton of granules of an inorganic cuprous compound possessing algicidal properties in said composition and which is substantially insoluble in water having a pH of from about 2 to 4, sufficient to maintain a condition toxic to the growth of algae on a surface coated with said granules for a period of years.

2. Roofing granules according to claim 1 wherein said copper compound is cuprous oxide.

3. Roofing granules according to claim 1 wherein said copper compound is cuprous bromide.

4. A composite sheet body for roofing and siding comprising a bituminous sheet material having a firmly adherent surfacing comprising granules according to claim 1.

5. A sheet body according to claim 4 wherein said algicidal granules are interspersed with conventional granules.

6. An outdoor algicidal surfacing comprising a weather-resistant substrate having a moisture permeable fired inorganic insolubilized alkali-metal silicate coating thereon containing at least 0.2% by weight of an inorganic copper compound possessing algicidal properties in such coating and which is substantially insoluble in water having a pH of from about 2 to 4.

7. Surfacing according to claim 6 wherein said copper compound is cuprous oxide.

8. Surfacing according to claim 6 wherein said copper compound is cuprous bromide.

9. Surfacing according to claim 6 wherein said substrate is an asbestos-cement roofing shingle.

10. A method of protecting exterior surfacing from the growth thereon of discoloring micro-organisms comprising (a) providing a weather-resistant substrate (b) coating said substrate with a hardenable inorganic composition containing at least about 0.2% by weight of a virtually water insoluble inorganic copper compound which is slightly soluble in acidic aqueous solutions (c) firing said coated substrate to a temperature above 350° F. to harden and insolubilize said inorganic composition and (d) surfacing with a plurality of said coated substrates an outdoor building structure in an area conducive to the growth of discoloring micro-organisms.

11. A method according to claim 10 wherein said hardenable inorganic composition is a mixture of an alkali metal silicate and a material selected from hydrous plastic clay and acidic materials which react during said firing step to form a hardened insoluble heat reaction product with said silicate.

12. An exterior building surface covered by a moisture permeable discontinuous layer of fired insoluble inorganic silicate material containing at least 0.2% by weight of an inorganic copper compound possessing algicidal properties and which is substantially insoluble in water having a pH of about 2 to 4.

13. A color coating composition suitable for preparing weather-resistant insolubilized and unglazed artificially colored coatings comprising in dilute aqueous suspension a mixture including substantial proportions of soluble alkali silicate, clay that is heat reactive with the alkali silicate, pigment, and an inorganic copper compound possessing algicidal properties in water having a pH of from about 2 to 4, sufficient to maintain a condition toxic to the growth of algae on a surface covered with said coatings for a period of years.

References Cited

UNITED STATES PATENTS

| | | | |
|---|---|---|---|
| 2,070,359 | 2/1937 | Hillers | 117—27 |
| 2,273,708 | 2/1942 | Hurd | 167—16 |
| 2,738,283 | 3/1956 | Furnes | 167—16 X |
| 2,951,770 | 9/1960 | Lodge | 117—100 |
| 3,162,569 | 12/1964 | Pastac | 167—16 |
| 629,426 | 7/1899 | Coleman | 117—26 |
| 3,100,718 | 8/1963 | Dunn | 106—15 |
| 3,100,719 | 8/1963 | Dunn | 106—15 |
| 3,423,229 | 1/1969 | Kompanek et al. | 117—169 |

FOREIGN PATENTS 640,458   3/1964   Belgium.

WILLIAM D. MARTIN, Primary Examiner

W. R. TRENOR, Assistant Examiner

U.S. Cl. X.R.

117—62, 100; 106—15, 84